(12) United States Patent
Norman

(10) Patent No.: US 7,889,472 B1
(45) Date of Patent: Feb. 15, 2011

(54) DUAL VOLTAGE HOT SWAP MODULE POWER CONTROL

(75) Inventor: Charles E. Norman, Nepean (CA)

(73) Assignee: Nortel Networks Limited, Mississauga, Ontario (CA)

( * ) Notice: Subject to any disclaimer, the term of this patent is extended or adjusted under 35 U.S.C. 154(b) by 724 days.

(21) Appl. No.: 11/553,937

(22) Filed: Oct. 27, 2006

(51) Int. Cl.
*H02H 3/08* (2006.01)
*H02H 3/20* (2006.01)

(52) U.S. Cl. ............................. 361/84; 361/82; 361/93.9

(58) Field of Classification Search .................... 361/84, 361/82, 93.9
See application file for complete search history.

(56) References Cited

U.S. PATENT DOCUMENTS

| | | | | |
|---|---|---|---|---|
| 5,374,887 A | * | 12/1994 | Drobnik | 323/299 |
| 5,920,186 A | * | 7/1999 | Ninh et al. | 323/303 |
| 6,462,924 B1 | * | 10/2002 | Watanabe et al. | 361/91.2 |
| 6,657,475 B1 | * | 12/2003 | Zahn | 327/309 |
| 6,735,064 B2 | * | 5/2004 | Miyazaki | 361/58 |

OTHER PUBLICATIONS

Input Bridge CR3 50WQ10FN, dated prior to Oct. 27, 2006 (1 pg.).

* cited by examiner

*Primary Examiner*—Stephen W Jackson
*Assistant Examiner*—Zeev Kitov
(74) *Attorney, Agent, or Firm*—Schwegman, Lundberg & Woessner, P.A.

(57) ABSTRACT

A module hot swap circuit includes a low voltage-drop rectifier adapted to receive either positive or negative voltages of different absolute values. The rectifier is coupled to a power manager that provides dual startup/shutdown voltage thresholds and inrush current limiting. A detector prevents reverse current flow allowing the module to hold up during input voltage drop-outs.

18 Claims, 4 Drawing Sheets

DUAL VOLTAGE HOT SWAP MODULE POWER CONTROL

BACKGROUND

In many telecom and information technology applications, hot pluggable modules are desired. A hot pluggable module is an electronic module that provides any number of different functions, but which can be plugged into a system without removing power from the system. In other words, it can be inserted into a hot or powered receptacle that is designed to couple the module to the system.

Modules for telecom applications may need to operate from either a +24 volt or −48 volt power supply provided at the receptacle and therefore need to correct the polarity of the supply. They should exhibit minimum power losses or heat dissipation, and should provide for dual voltage (24 and 48) start-up/shutdown threshold control. Such modules should also provide some form of start-up delay and should control or limit their inrush current. Further, the modules should hold up during supply drop-out; that is, block reverse current flow.

Existing power input circuits for modules can be quite complex, yet do not provide all of these desired features.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
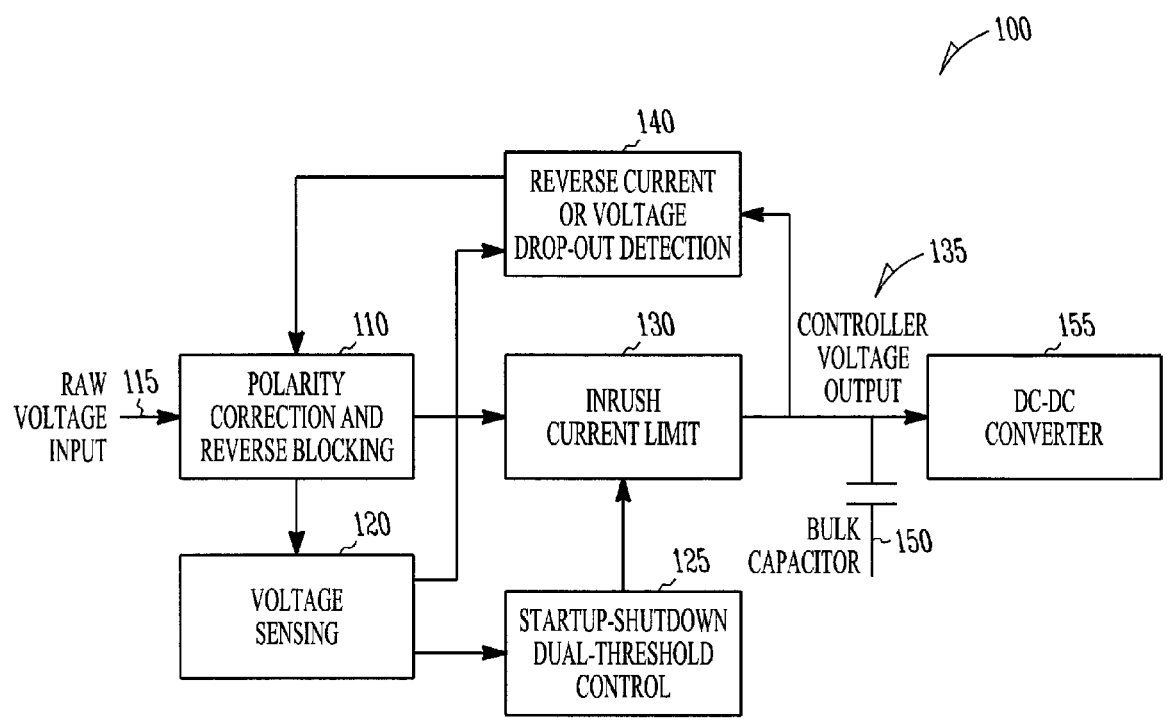
FIG. 1 is a simplified block diagram showing functional elements of a circuit for providing hot swapping of modules for dual supplies according to an example embodiment.

FIG. 1 is a block diagram showing functional elements of a circuit 100 for providing hot swapping of modules into dual supplies according to an example embodiment. In one embodiment, the hot swap circuit includes a rectifier 110 adapted to receive either positive voltage or a negative voltages of different absolute values at input 115. A voltage sensor 120 is coupled to the controller 125, which provides dual startup/shutdown voltage thresholds and controls inrush current limiting 130, to provide power to an output 135, which is normally a DC-DC converter 155 and a bulk energy storage capacitor 150. A detector 140, or comparator, detects input voltage drop-outs and shuts off the rectifier 110 to prevent reverse current flow.

In one embodiment, the rectifier comprises a FET bridge that is adapted to receive input voltages of approximately 24 volts and −48 volts. Other voltages may also be received in further embodiment. In one embodiment, the detector 140 shuts off the FET bridge 110 as a function of detected reverse current flow or input voltage drop-out.

Figure 2:
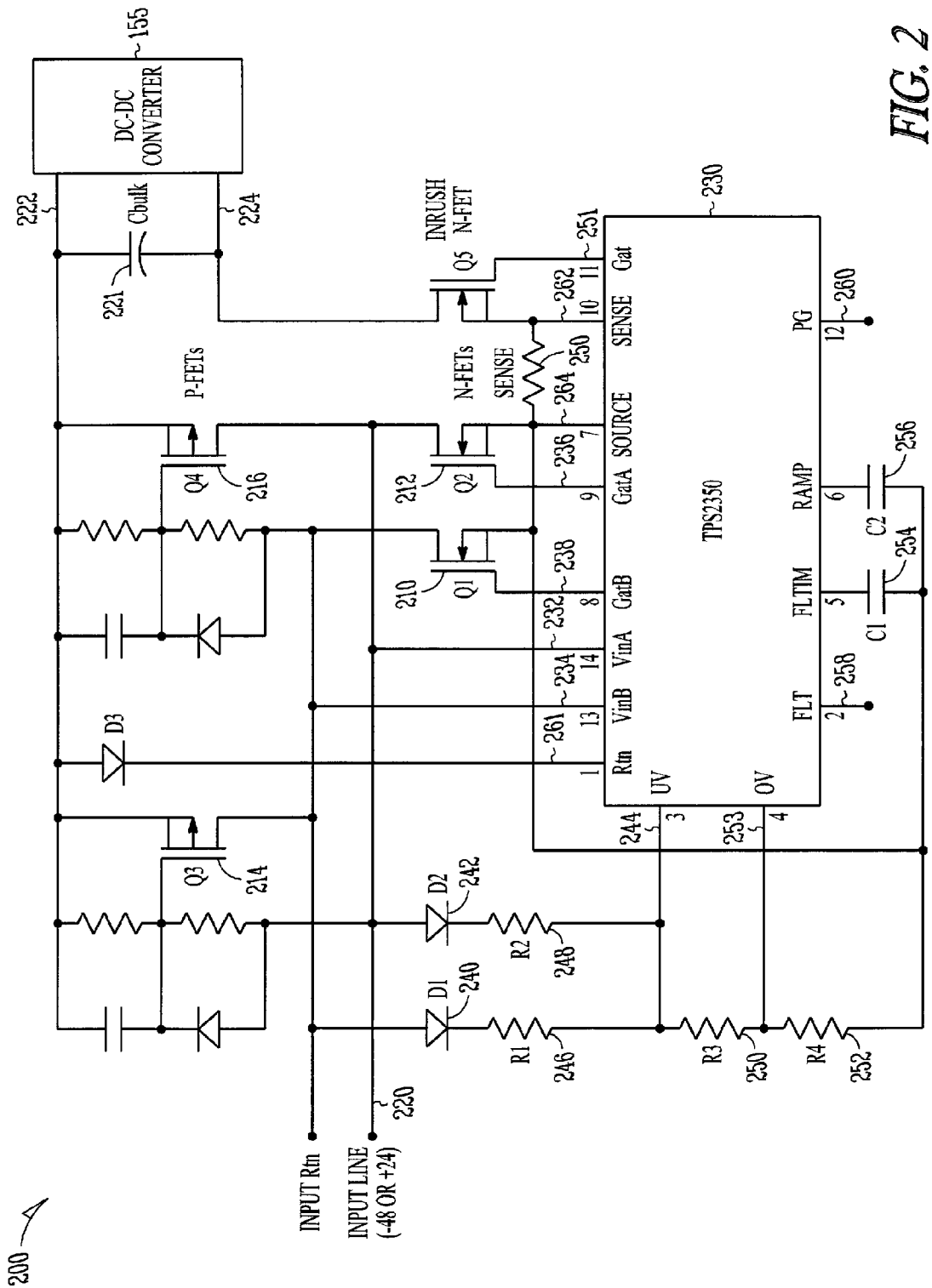
FIG. 2 is a circuit diagram illustrating most of the circuit of FIG. 1 according to an example embodiment.

FIG. 2 is a circuit diagram illustrating the circuit of FIG. 1 according to an example embodiment. In one embodiment, body diodes of FETs 210-Q1, 212-Q2, 214-Q3 and 216-Q4, act as a bridge rectifier to correct the polarity of an incoming supply 220. The corrected polarity enables a downstream DC-DC converter 155 coupled to a bulk storage capacitor 221 and output lines 222, 224 to see only positive voltages. In one embodiment, passive components around the p-FETs turn ON whichever of FETs 214-Q3 or 216-Q4 is the correct polarity, to reduce its voltage drop.

The bridge is coupled to a hot-swap chip 230, such as TPS2350 released by Texas Instruments in 2005, but other chips may be suitable, such as one provided by Maxim. The hot-swap chip 230 selects whichever supply line to the chip (232-A or 234-B) has the higher voltage and turns on its n-FET, Q1 or Q2 (in this circuit the other line will have zero volts) via gate A-236 and gate B-238 control lines, thereby reducing its voltage drop. Whichever supply line 232, 234 is higher also feeds through diodes D1-240 or D2-242 to a voltage threshold detect input 244 of the hot-swap chip 230. In one embodiment, a diode D3-245 provides a positive voltage supply to the hot swap chip (18 to 60V).

A voltage divider network of resistors R1-246, R2-248, R3-250 and R4-252 is designed such that the start-up and shut-down thresholds can be set to appropriate levels for both +24 and −48V supplies. When the input exceeds 1.4 Vdc at pin 244 in one embodiment, the hot swap chip 230 decides to turn on Q5 to power up the load. If this voltage drops by the specified hysteresis, it will shut off Q5. Different resistor values may be used for different desired supply levels. The resistors are also coupled to an over voltage pin 253 of the hot-swap chip 230.

In one embodiment, the hot-swap chip 230 senses the current through a sense resistor 250 coupled between bridge FET Q1-210 and Q2-212 outputs, and the source of an inrush FET Q5-252. Current through the sense resistor 250, approximately 7 milli-ohms in one embodiment, allows the hot-swap chip 230 to adjust the n-FET 252-Q5 gate drive 251 to control the circuit inrush current and thereby charge up the bulk capacitor 221 and start-up the downstream DC-DC converter 225.

Based on the ramp rate capacitor 256 and the sense resistor 250, the chip controls the inrush current. In continuing operation, the chip 230 monitors the supply voltages and the load current continually. In the event of a fault on the load, it will shut off Q5 via the GAT pin 251 within a few microseconds. As described above, if the supply voltage drops below the shutdown threshold at 244, the chip will shut off Q5. If there is an upstream fault that drops the supply voltage, then the same thing happens.

In one embodiment, a capacitor C1-254 coupled to the swap chip 230 sets a "try-again" time for fault conditions (overload-current), if needed. A capacitor C2-256 sets a dI/dt ramp rate for the inrush (soft-start) if needed. A FLT pin 258 is a fault alarm output. A pin PG at 260 is a power-good signal, which could be used to enable the DC-DC converters.

Figure 3:
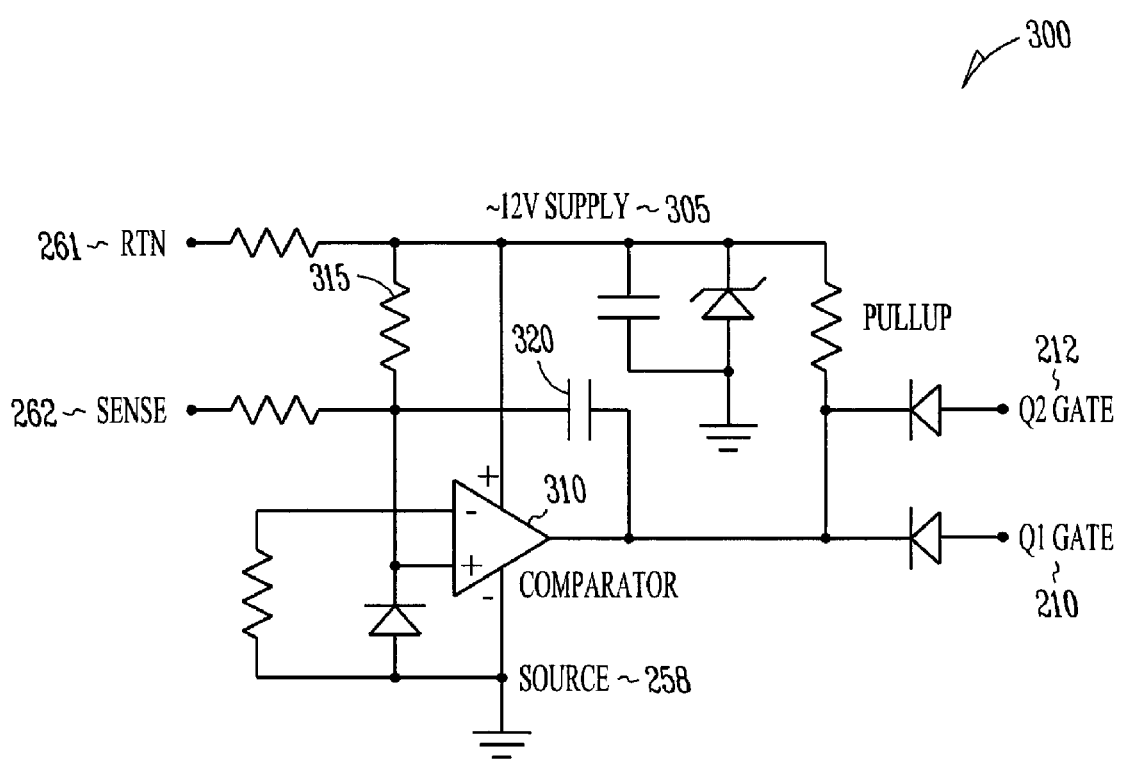
FIG. 3 is a circuit diagram of a comparator for operating with the circuit of FIG. 2 according to an example embodiment.

Once everything is powered up, the voltage drop between the supply 220 and the DC-DC converter 155 is very low and the input losses/dissipation are minimal. If the supply voltage drops out (i.e. the voltage at 220 is lower than that on capacitor 221), the current through the sense resistor will reverse. An added comparator circuit 300 in FIG. 3 will detect the reverse current and shut off both n-FETs Q1-210 and Q2-212 for a short time (a few ms), thus blocking the reverse current flow. When the supply voltage recovers, the Q1-210 or Q2-212 body diode will conduct once again, allowing power to flow into the circuit. After the comparator 300 times out, it will once again allow the hot-swap chip to turn on Q1-210 or Q2-212, returning the system to normal operation.

In further detail, comparator circuit 300 monitors the direction of the current flowing through sense resistor 250. The circuit is powered at a suitable voltage derived from the supply at the RTN pin 261 of the hot-swap controller 230. Comparator 310 monitors the voltage difference between the Source 264 and Sense 262 pins of the controller. Resistor 315 ensures that the offset voltage of the comparator will not trigger a turn off under normal DC load conditions. The output of comparator 310 is coupled to gates of Q1-210 and Q2-212 through diodes so that the comparator cannot turn on either n-FET. Timing capacitor 320 keeps the comparator output low after the reverse current through sense resistor 250 is blocked when Q1-210 and Q2-212 are off.

Figure 4:
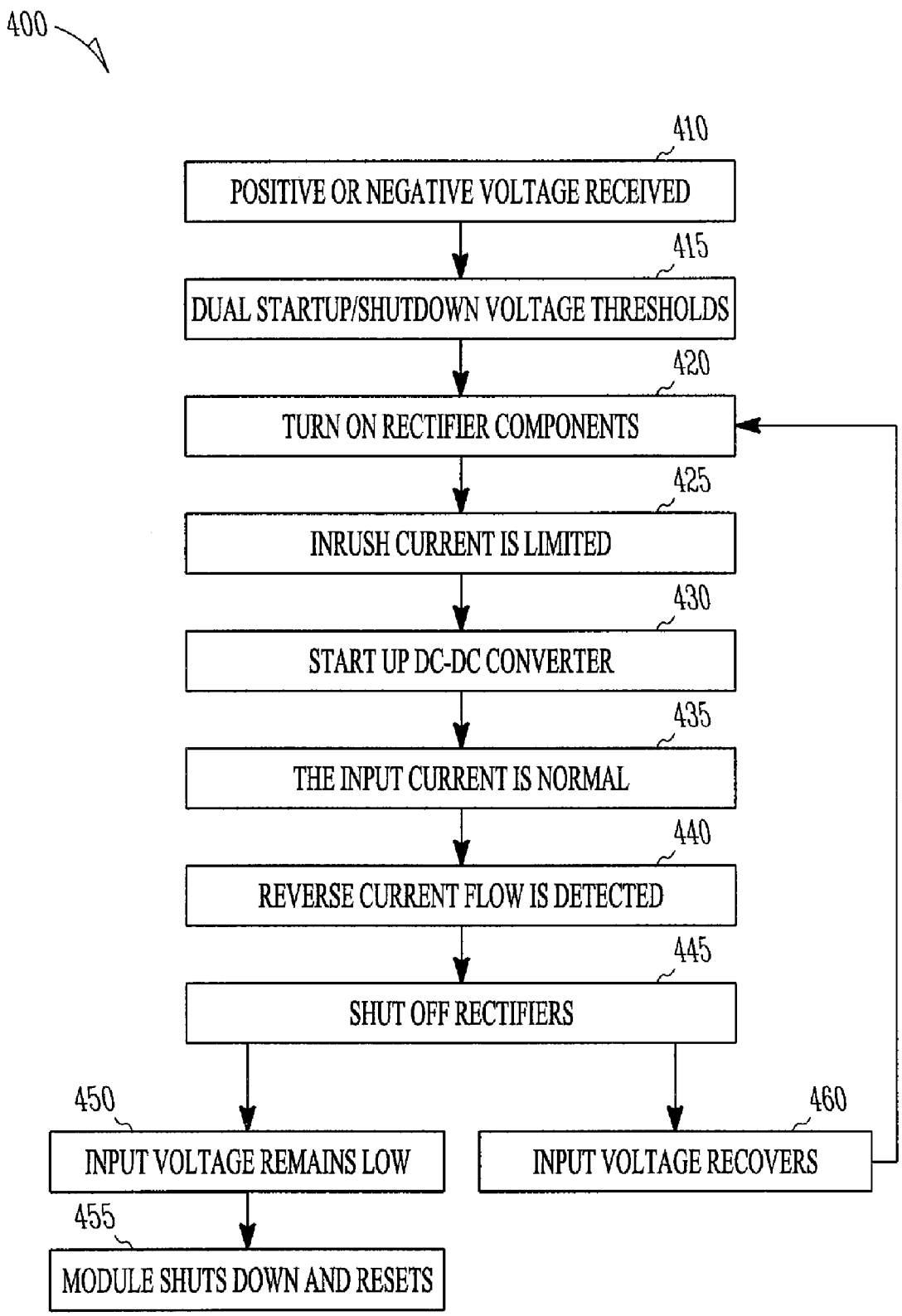
FIG. 4 is a flowchart illustrating a method of accepting dual voltages for a hot swap module according to an example embodiment.

A method 400 of hot-swapping a telecommunications (or other) module is described with respect to the flowchart in FIG. 4. Either a positive or negative voltage of the same or different absolute value are received at 410 and are rectified. Dual startup/shutdown voltage thresholds are provided at 415 and the appropriate rectifier components are turned on at 420 to reduce their voltage drops. If the voltage level is sufficient, the output is turned on and the inrush current is limited at 425 as the output voltage ramps up. At 430 the DC-DC converter starts up and the module load receives its power. Once the module is in normal operation at 435, the current flow is continually monitored at 440 to detect reverse current flow due to input voltage drop-out. In that event, the rectifiers are shut off at 445 to block the reverse flow. If the input voltage remains low in 450, the module will shut down and the hot-swap circuit will reset at 455. If the input voltage recovers during the module hold-up time at 460, then the hot-swap circuit will remain on and the sequence of events will recommence at 420.

In one embodiment, receiving either positive or negative voltages of different absolute values and rectifying such received voltages is provided by a power MOSFET bridge adapted to receive input voltages of approximately 24 volts and −48 volts. The FET bridge may be shut off as a function of detected reverse current flow. In a further embodiment, a controller circuit monitors current through a sense resistor and adjusts gate drive on the inrush FET to control the inrush current, to allow startup of a down stream DC-DC converter.

Various embodiments may have several advantages over previous circuits, such as fewer parts, reduced power loss, less room on the circuit card, and possibly less expensive. Some embodiments may also provide more precise inrush current limit control, and may also allow easier-to-calculate component values and simplification of the circuit design. In one embodiment, it may provide faster and better-defined response to anomalous conditions such as voltage drop-outs, and likely more precise and easier-to-calculate voltage thresholds. In further embodiment, the simpler overall and general approach can be used on other cards, or in systems with other voltage levels.

The Abstract is provided to comply with 37 C.F.R.§1.72(b) to allow the reader to quickly ascertain the nature and gist of the technical disclosure. The Abstract is submitted with the understanding that it will not be used to interpret or limit the scope or meaning of the claims.

The invention claimed is:

1. A hot swap circuit comprising:
    a rectifier adapted to receive either positive or negative voltages of the same or different absolute values;
    a controller that reduces the voltage drop of the rectifier, and
    provides dual startup/shutdown voltage thresholds and inrush current limiting;
    a voltage divider network coupled to the controller to set different startup/shutdown voltage thresholds as a function of different polarity voltages received at the rectifier; and
    a detector that detects reverse current flow and shuts off the rectifier.

2. The hot swap circuit of claim 1 wherein the rectifier comprises a power MOSFET bridge.

3. The hot swap circuit of claim 2 wherein the bridge is adapted to receive input voltages of approximately 24 volts and −48 volts.

4. The hot swap circuit of claim 3 wherein the rectifier is adapted to receive input voltages of approximately 24 volts and −48 volts.

5. The hot swap circuit of claim 2 wherein the detector shuts off the FET bridge as a function of detected reverse current flow.

6. The hot swap circuit of claim 5 wherein the detector includes a sense resistor and comparator coupled to a first pair of FETs in the bridge.

7. The hot swap circuit of claim 6 wherein the controller includes an inrush FET coupled to the sense resistor, senses current through the sense resistor and adjusts gate drive on the inrush FET to control the inrush current to allow startup of a down stream DC-DC converter.

8. The hot swap circuit of claim 5 wherein the controller is coupled to the first pair of FETs in the bridge and turns on a different one of the FETs in response to the different input voltage levels.

9. A hot swap circuit for a telecommunications module, the hot swap circuit comprising:
    means for reducing a voltage drop of a rectifier;
    means for receiving either positive or negative voltages of the same or different absolute values and rectifying such received voltages;
    means for providing dual startup/shutdown voltage thresholds and inrush current limiting; and
    means for detecting reverse current flow and shutting off the rectifier means for setting the voltage thresholds as a function of different polarity voltages received at the receiver.

10. The hot swap circuit of claim 9 wherein the rectifier comprises a power MOSFET bridge.

11. The hot swap circuit of claim 10 wherein the MOSFET bridge is adapted to receive input voltages of approximately 24 volts and −48 volts.

12. The hot swap circuit of claim 10 wherein the means for detecting shuts off the MOSFET bridge as a function of detected reverse current flow.

13. The hot swap circuit of claim 12 wherein the means for detecting includes a sense resistor and comparator coupled to a first pair of FETs in the MOSFET bridge.

14. The hot swap circuit of claim 13 wherein the means for providing inrush limiting includes an inrush FET, senses current through the sense resistor and adjusts gate drive on the inrush FET to control the inrush current to allow startup of a down stream DC-DC converter.

15. A method of hot swapping a telecommunication module, the method comprising:
- receiving either positive or negative voltages of the same or different absolute values and rectifying such received voltages using a rectifier;
- providing dual startup/shutdown voltage thresholds and inrush current limiting as a function of different polarity voltages received;
- reducing the voltage drop through the rectifier; and
- detecting reverse current flow and blocking it by shutting off the rectifier.

16. The method of claim 15 wherein receiving either positive or negative voltages of the same or different absolute values and rectifying such received voltages is provided by a FET bridge adapted to receive input voltages of approximately 24 volts and −48 volts.

17. The method claim 16 wherein the FET bridge is shut off as a function of detected reverse current flow.

18. The method of claim 15 wherein current flow is detected by an inrush FET that senses current through a sense resistor and adjusts gate drive on the inrush FET to control the inrush current to allow startup of a down stream DC-DC converter.

* * * * *

UNITED STATES PATENT AND TRADEMARK OFFICE
CERTIFICATE OF CORRECTION

| | | |
|---|---|---|
| PATENT NO. | : 7,889,472 B1 | Page 1 of 1 |
| APPLICATION NO. | : 11/553937 | |
| DATED | : February 15, 2011 | |
| INVENTOR(S) | : Charles E. Norman | |

It is certified that error appears in the above-identified patent and that said Letters Patent is hereby corrected as shown below:

In column 4, lines 47-50, in Claim 9, delete
"means for detecting reverse current flow and shutting off the rectifier means for setting the voltage thresholds as a function of different polarity voltages received at the receiver." and insert -- means for detecting reverse current flow and shutting off the rectifier;
means for setting the voltage thresholds as a function of different polarity voltages received at the receiver. --, therefor.

In column 6, line 4, in Claim 17, after "method" insert -- of --.

Signed and Sealed this
Twelfth Day of April, 2011

David J. Kappos
*Director of the United States Patent and Trademark Office*